United States Patent [19]

Kawaguchi

[11] 4,250,979
[45] Feb. 17, 1981

[54] DISC BRAKE APPARATUS

[75] Inventor: Takeshi Kawaguchi, Fujimi, Japan

[73] Assignee: Honda Giken Kogyo Kabushiki Kaisha, Tokyo, Japan

[21] Appl. No.: 22,269

[22] Filed: Mar. 20, 1979

[30] Foreign Application Priority Data

Mar. 29, 1978 [JP] Japan .................................. 53-35438

[51] Int. Cl.³ ............................................. F16D 55/02
[52] U.S. Cl. .............................. 188/71.6; 188/264 A
[58] Field of Search .......... 188/71.6, 264 A, 264 AA, 188/218 X L, 71.3, 71.4, 71.5

[56] References Cited

U.S. PATENT DOCUMENTS

| 2,215,421 | 9/1940 | Eksergian | 188/218 X L |
|---|---|---|---|
| 3,059,730 | 10/1962 | Nickell et al. | 188/264 A X |
| 3,444,966 | 5/1969 | Braukhoff | 188/71.6 X |

FOREIGN PATENT DOCUMENTS 515936 12/1952 Belgium ............................... 188/264 A Primary Examiner—Douglas C. Butler
Attorney, Agent, or Firm—Haseltine, Lake & Waters

[57] ABSTRACT

There is disclosed a disc brake apparatus exhibiting an arrangement in which a pair of side panels are disposed on either side of the exterior of a wheel hub. These panels are provided, at their inner surfaces, with a pair of brake pistons, each of the pistons being arranged to face, at the forward end of a brake pad, a disc brake secured to one side surface of the wheel hub. The invention is characterized by the provision of an air space within the wheel hub, such air space being in communication with the ambient air. Further, each brake disc is provided on its back surface with plural fins projecting therefrom, such fins also being exposed to the aerodynamic conditions within the air space within the wheel hub.

8 Claims, 9 Drawing Figures

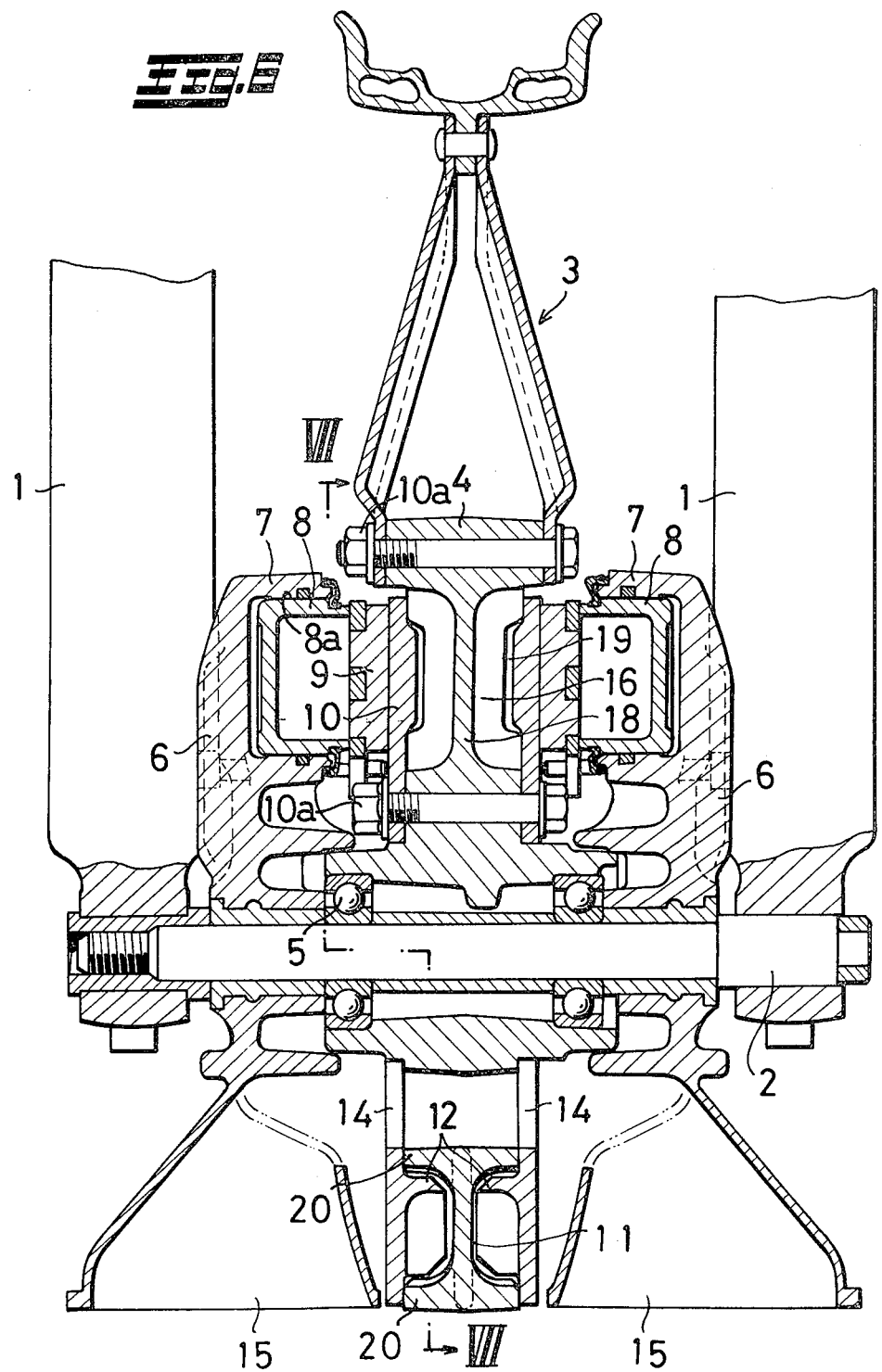

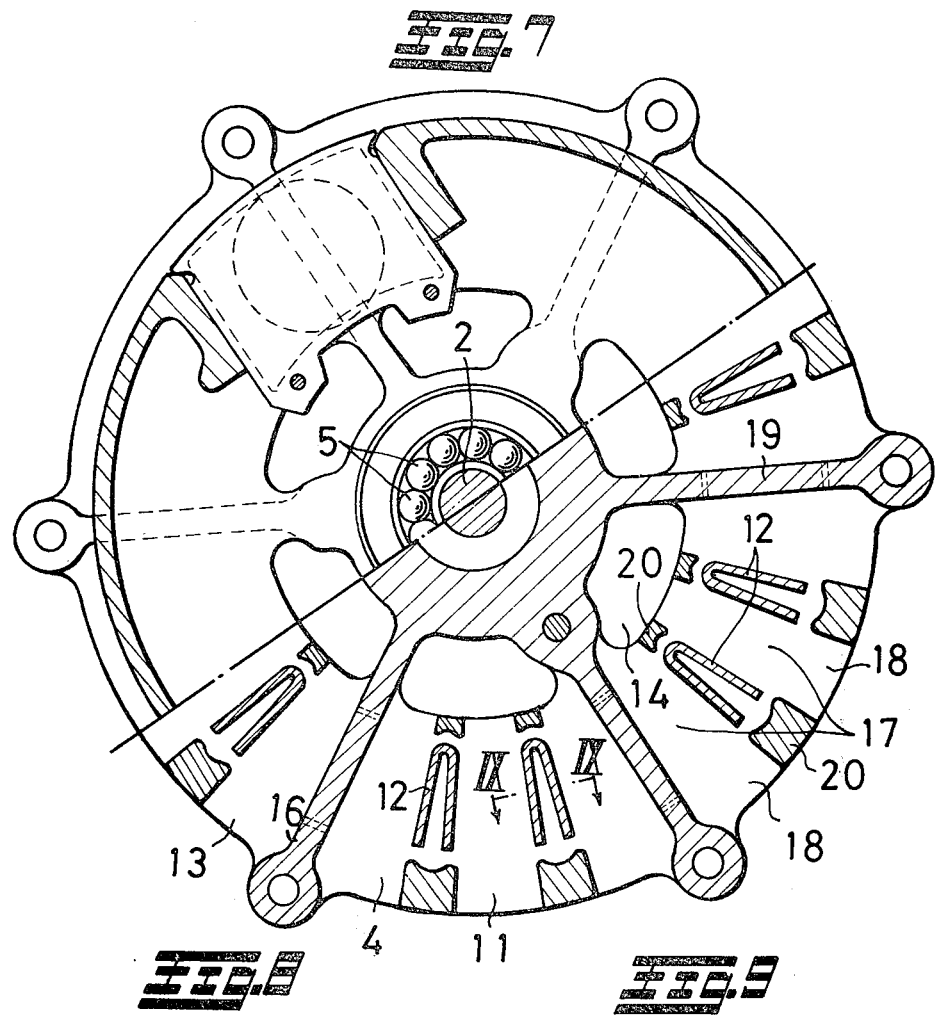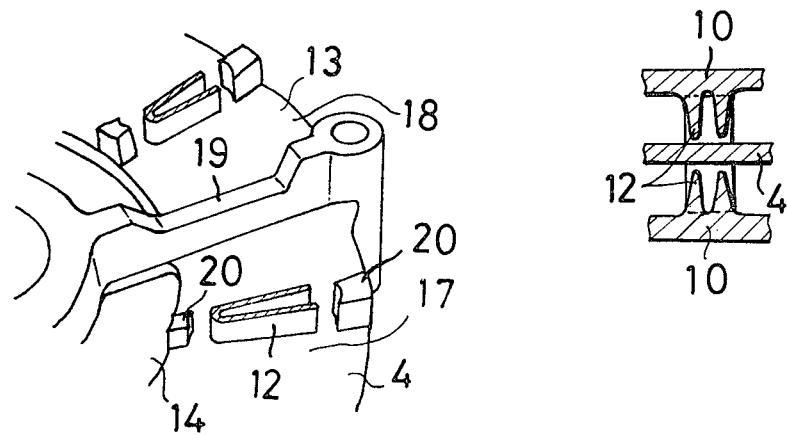

DISC BRAKE APPARATUS

BACKGROUND OF THE INVENTION

The present invention relates to a disc brake apparatus of the type used primarily in motorized two wheel vehicles such as motorcycles and motorbikes.

The prior art with reference to disc brake arrangements used in two wheel vehicles has seen the use of a pair of right and left side panels on either side of the wheel hub, the panels being provided, at their inner surfaces, with at least a pair of right and left brake pistons. Each of these pistons are arranged to face a brake pad at their forward ends, and a brake disc is secured to each side surface of the wheel hub. It has been found that the above conventional arrangement leaves much to be desired inasmuch as it exhibits a poor heat diffusion characteristic. This is due to the arrangement of elements wherein the brake disc is wholly covered by the aforesaid side panels.

It is therefore an object of the present invention to provide an apparatus which is free of the above heat diffusion problem.

It is a more particular object of the present invention to provide an improved disc brake apparatus which will not suffer from overheating to the extent evident in such devices in the prior art.

Yet further objects will become apparent from the hereinafter set forth Detailed Description of the Invention.

SUMMARY OF THE INVENTION

The present invention comprises a disc brake apparatus having a pair of side panels, one disposed on the right side of the wheel hub and the other disposed on the left side of the wheel hub, each provided at their inner surfaces with at least one brake piston. Each of the brake pistons is arranged to face, in the direction of the forward end of the brake pad, a brake disc secured to each side surface of the wheel hub. The invention is characterized in the provision of an air space within the wheel hub, said air space being in communication with the ambient air about the wheel. Each brake disc is further provided, on its back surface, with plural fins projecting therefrom. The movement of the brake discs during operation will give rise to an associated movement of said plural fins, thus enhancing the heat diffusion characteristic of the entire apparatus.

BRIEF DESCRIPTION OF THE DRAWINGS

FIG. 6 is a sectional view, similar to the view of FIG. 2, however, illustrating a second embodiment of the present invention.

FIG. 7 is a sectional view taken along line 7—7 of FIG. 6.

FIG. 8 is a perspective fragmentary view of the plural fins employed in the second embodiment of the present invention.

FIG. 9 is a sectional view taken along line 9—9 of FIG. 8.

DETAILED DESCRIPTION OF THE INVENTION

Figure 1:
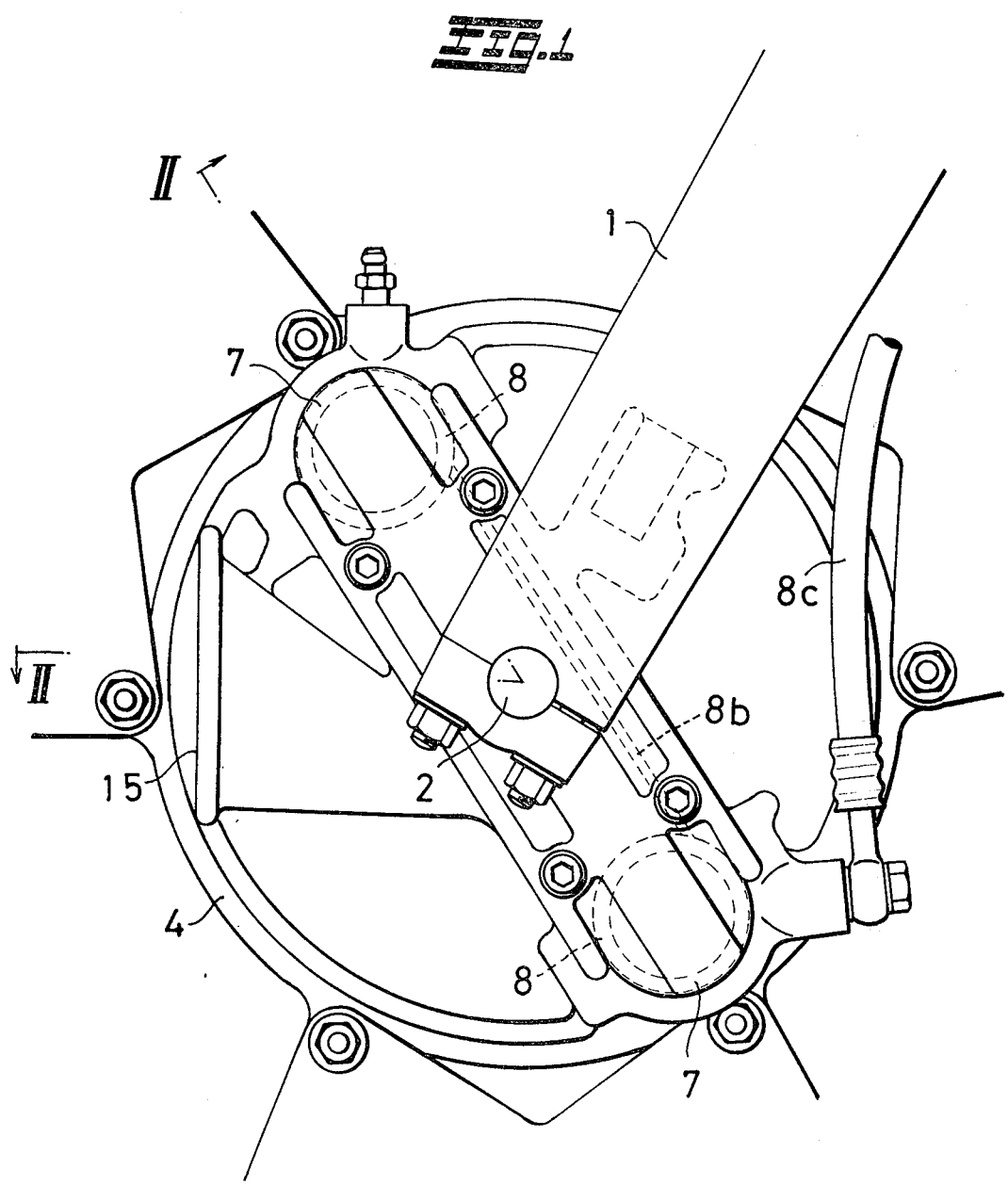
FIG. 1 is a side view of a first embodiment of the present invention.

With reference to the drawings and, in particular, FIG. 1 thereof, numeral 1 denotes one side of a pair of right and left front forks as, typically, are present in the front of a motorcycle. Numeral 2 denotes a wheel axle disposed transversely between the front ends of the said right and left front forks 1. Further shown is a front wheel 3 rotatably mounted at its central wheel hub 4 through a ball bearing 5 upon said wheel axle 2. Additionally shown are a pair of right and left side panels 6. The panels are fixedly provided on both outside areas of the hub 4.

Also illustrated in FIG. 1 are a pair of mutually facing right and left caliper bodies 7. Further provided is a second pair of caliper bodies (not shown) which are respectively formed and disposed on the diametric line of the inner surfaces of the side panels 6 in order to project integrally therefrom. Also provided are a pair of right and left oil pressure operated brake pistons 8, the same arranged so as to be movable both forward and backward. It is also noted that the said pistons 8 are arranged in order to face respective brake pads 9 on their forward ends in order to interact with a respective pair of brake discs 10, the same being secured to the side surfaces of said wheel hub 4.

Figure 2:
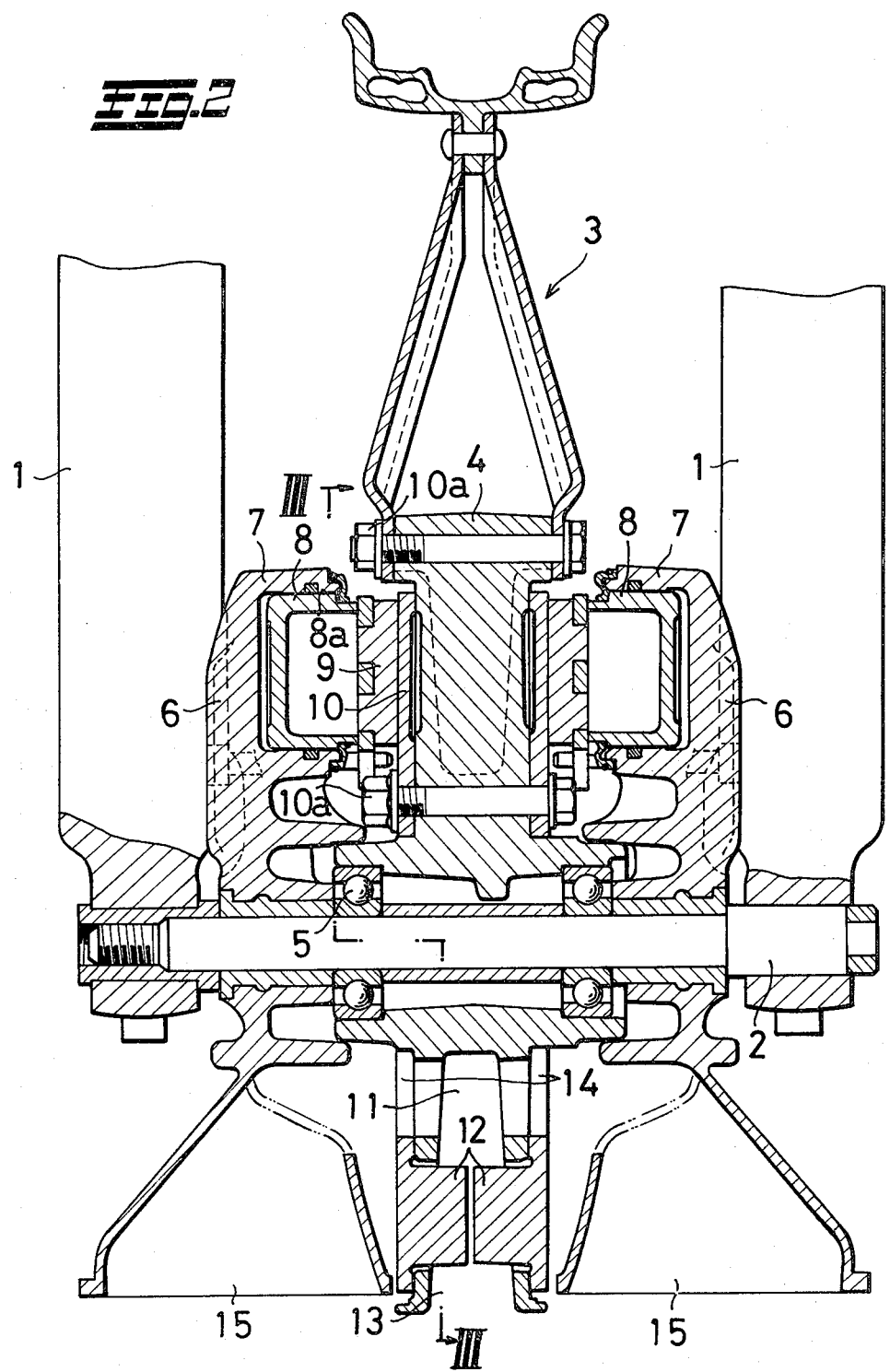
FIG. 2 is a sectional view taken along line 2—2 of FIG. 1.

With reference to FIG. 2, there is shown a bolt 10a employed for the securement of the brake discs 10.

Thusly, as shown in FIG. 2, there is provided said side panels 6 on each side of the wheel hub. Further, the side panels 6 are provided with said pair of caliper bodies 7 as well as brake cylinders 8a which cooperate with the respective brake pistons 8 and are interconnected thereto through a conduit 8b (see FIG. 1). The brake cylinders are further in communication with the oil supply tube 8c which extends to a master cylinder (not shown).

In the present invention, an air space 11 is formed within the wheel hub 4, the air space being in communication with the ambient air about the apparatus. The brake discs 10 are provided on their back surfaces with plural fins 12 projecting therefrom. As may be noted in FIG. 4, said fins 12 are exposed within the interior of said air space 11.

With further regard to said air space 11, the same comprises an annular groove which is in communication with the ambient air through a radially outer edge opening 13 and a radially inner edge opening 14. Further, said plural fins 12 are disposed annularly, as is shown in FIGS. 3 and 4, to act as a centrifugal fan actuated by the rotation of the disc 10.

Additionally, an enclosed air chamber is formed between the side panel 6 and the hub 4 to provide an opening 15 for the introduction of external air. The opening 15 is adapted in order to enable the introduction of external air into the opening 15 when the motorcycle or similar vehicle is in operation.

Figure 3:
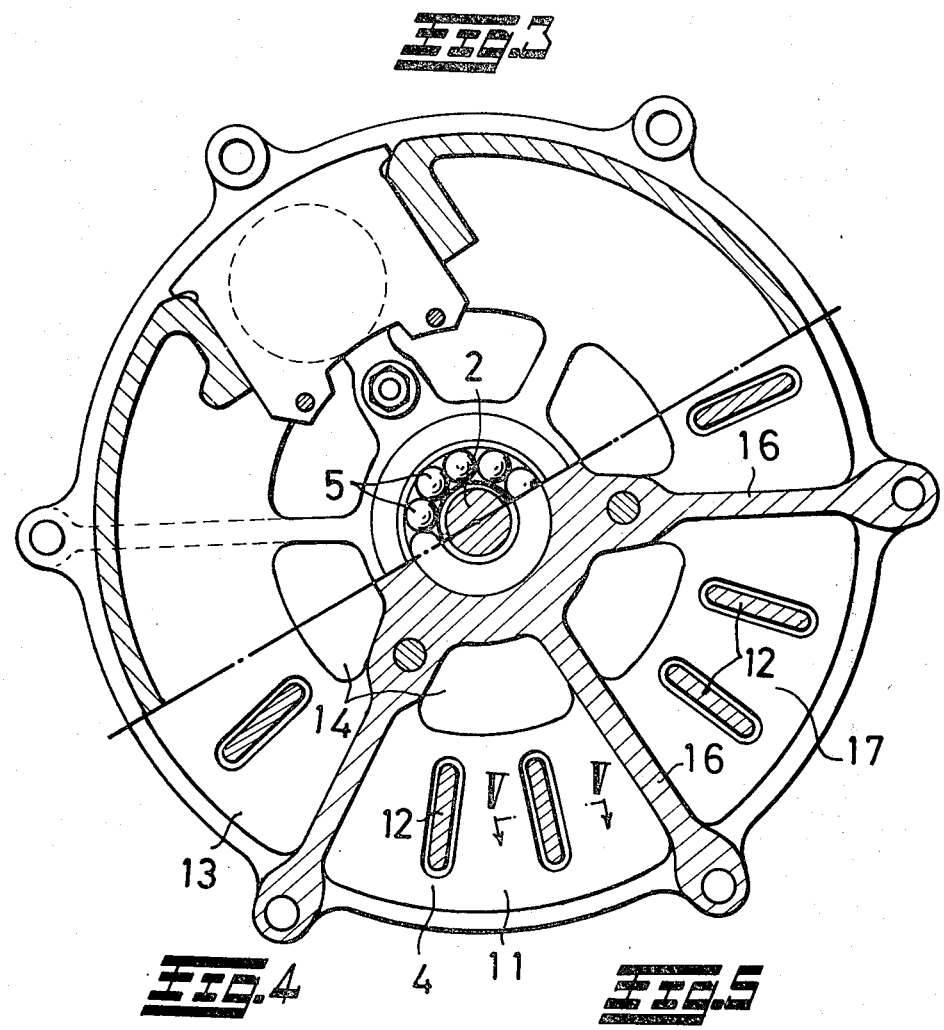
FIG. 3 is a sectional view taken along line 3—3 of FIG. 2.
Figures 4, 5:
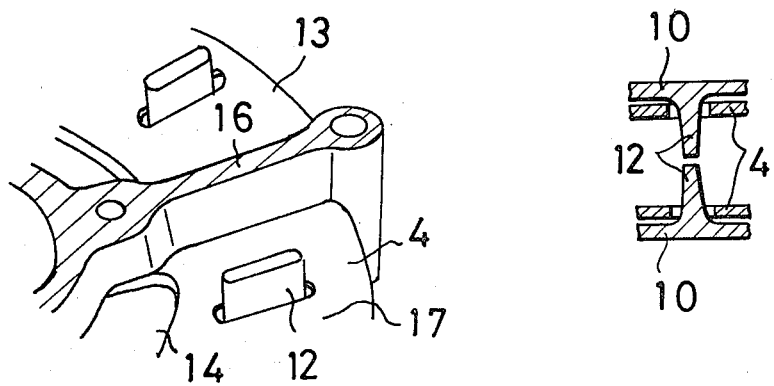
FIG. 4 is a perspective fragmentary view of the plural fins of the embodiment of FIG. 1.
FIG. 5 is a sectional view taken along line 5—5 of FIG. 3.

With reference to FIGS. 3 and 4, it is noted that the interior of the annular air space is partitioned into a plurality of small chambers 17. These chambers are formed by a corresponding plurality of radially extending ribs 16. As aforenoted, the interior of each chamber 17 is in communication with the ambient air through a portion of the outer edge opening 13 and a portion of the inner edge openings 14, on both sides thereof.

A second embodiment of the present invention is illustrated in FIGS. 6 through 9. In this embodiment the air space 11 comprises right and left annular grooves formed on both sides of a middle partition wall 18 of the hub 4. Further, each rib 16 within each groove exhibits a cut-out portion 19 so that adjacent chambers 17 may be in communication with one another through a cut-out portion 19. Furthermore, each fin 12 is formed into a U-shaped section and, therein, is provided on both its inner and outer sides with spacers 20, the same projecting from the partition wall 18. The apparatus, in operation, functions as follows:

When the left and right brake pistons 8 are advanced, the respective brake pads 9, on their forward ends, are brought into pressure contact with the corresponding disc 10 on the same side thereof. Consequently, the wheel 3 is imparted with a predetermined brake action. Such action is not especially different from the brake action of a conventional motorcycle. However, in the present invention, the heat generated at the disc 10 is diffused through the respective fins 12, off their back surfaces, and into the air space 11. Also, the plural fins 12 act as centifugal fans in order to introduce cool external air into the air space 11. Thus, as a whole, the brake discs 10 of the present device will enjoy a good heat diffusion characteristic.

In the invention as above described, an improved air cooling effect will be attained without requirement for any enlargement in the size of the brake disc apparatus. Further, an apparatus constructed in accordance with the present invention will be of comparatively small size and, further, will be light in weight.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

I claim:

1. A brake disc apparatus for a front wheel for a motorized two-wheeled vehicle such as a motorcycle or the like, comprising:
   (a) a wheel hub having therein an air space in communication with the external air;
   (b) a pair of left and right side panels disposed on opposite sides of said wheel hub;
   (c) a pair of left and right brake pistons disposed at the inner surfaces of said side panels;
   (d) a pair of brake discs, said discs in distalproximate arrangement to their corresponding brake pistons, each of said discs being secured to a side surface of the wheel hub; and
   (e) plural fins provided on the back surface of each disc brake, said fins projecting from said discs, said fins being exposed to the interior of said air space provided within said wheel hub,
   whereby advancement of said brake discs during braking action will cause said plural fins to act as centrifugal fans which will introduce cool air into said air space and will thus improve the heat diffusion characteristic of the apparatus, said air space being formed between the left and right side panels and being provided on its front surface with an opening adapted for the introduction of external air.

2. The apparatus as recited in claim 1 in which said wheel hub further comprises at least one annular groove, the same constituting said air space within said wheel hub, said annular groove being open to the ambient air at its radially outer edge portion and at its radially inner edge portion.

3. The apparatus as recited in claim 2 in which said wheel hub comprises left and right annular grooves, the same comprising said air space, the same positioned on both exterior surfaces of a middle partition wall within said air space.

4. The apparatus as recited in claim 3 in which said plural fins are annularly disposed.

5. The apparatus as recited in claim 3 in which said annular groove is partitioned into a plurality of chambers through the use of a corresponding plurality of radially extending ribs.

6. The apparatus as recited in claim 3 in which said partition wall is provided on each side thereof with respective spacers disposed upon both the inner and outer sides of each of said fins.

7. Apparatus as defined in claim 1 wherein said air space is partitioned into a plurality of substantially small chambers formed by a corresponding plurality of radially extending ribs, the interior of each of said chambers being in communication with ambient air through a portion of an outer edge opening and a portion of an inner edge opening on both sides thereof.

8. Apparatus as defined in claim 1 wherein said wheel hub further comprises at least one annular groove, the same constituting said air space within said wheel hub, said annular groove being open to the ambient air at its radially outer edge portion and at its radially inner edge portion, said wheel hub comprising left and right annular grooves, the same comprising said air space, the same positioned on both exterior surfaces of a middle partition wall within said air space, said annular groove being partitioned into a plurality of chambers through the use of a corresponding plurality of radially extending ribs, said partition wall being provided on each side thereof with respective spacers disposed upon both the inner and outer sides of each of said fins.

* * * * *